United States Patent Office 3,346,921
Patented Oct. 17, 1967

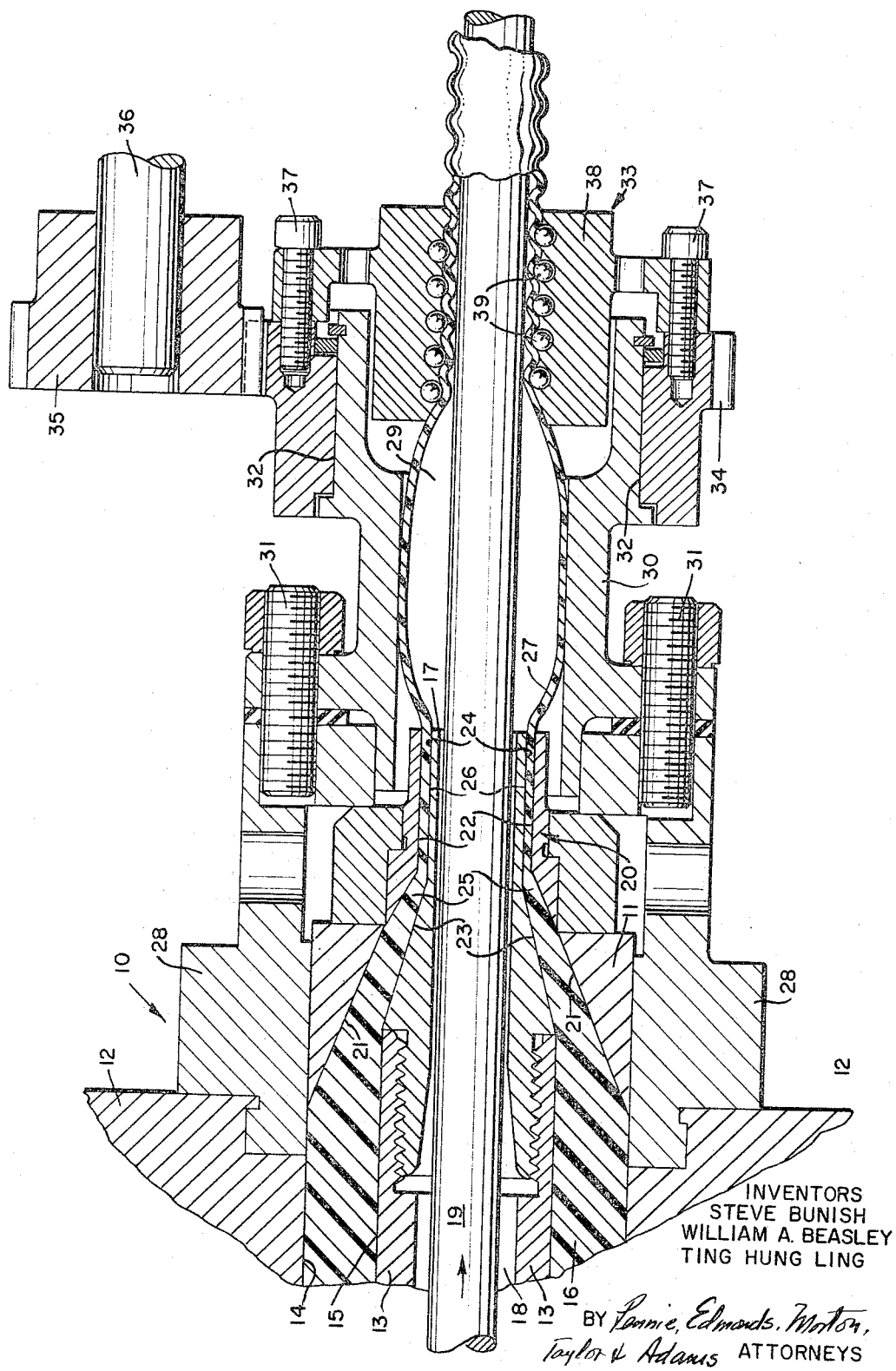

3,346,921
CORRUGATED PLASTIC COVERING FOR
ELECTRICAL CABLES
Steve Bunish, Marion, William A. Beasley, Fairmount, and Ting Hung Ling, Marion, Ind., assignors to Anaconda Wire and Cable Company, New York, N.Y., a corporation of Delaware
Filed Mar. 11, 1966, Ser. No. 533,575
2 Claims. (Cl. 18—14)

ABSTRACT OF THE DISCLOSURE

An apparatus is used to prepare helically corrugated plastic covering for electrical cable. The apparatus uses a rotating die with helical embossing tread for pulling and simultaneously corrugating a freshly extruded plastic tube covering an electrical conductor.

This invention relates to corrugated plastic covering for electrical cables and, more particularly, to the method and apparatus for producing the same. This invention also relates to cables produced in accordance with the method of this invention.

Metallic coverings of wire- and tape-armor coverings or impervious extruded coverings are commonly used to provide mechanical protection for insulated cables. Usually, metallic wire and tape coverings are used together with an impervious extruded covering to prevent the entrance of moisture, fumes, etc., into the cable core and to protect against sunlight and weather. The most commonly used extruded covering is lead sheath which may be produced from 99.85% pure lead or it may be produced from lead alloys containing copper, tin, arsenic, antimony, or calcium. Alloyed lead sheaths are chosen for their greater resistance to stress and strain found on service. Demands for better sheaths, however, lead to the development for new alloys which may have a higher resistance against fatigue, bending, vibration, creep, abrasion, and internal pressure. Up to now, not all these desirable characteristics have been met by any one lead alloy.

Increasing costs for the new alloys and their inability to satisfy fully the requirements for modern cable coverings create demands for new covering materials. Modern plastics, such as polyethylene, polypropylene, acetal, resin polyvinylchloride, polycarbonates and particularly the high density polyolefins possess a number of desirable properties and are found to be suitable as cable coverings. Heretofore, their use in this field has been limited because of their low flexibility when a relatively thick covering that meets the required physical strength and the abrasive resistance is used. Attempts to reduce their rigidity by a chemical additive have not been successful due primarily to the simultaneous lowering of physical strength and the decrease of other desirable properties. Increasing flexibility by corrugation also met with failure because corrugation techniques developed for extruded metallic coverings cannot be used for plastic materials.

It is, therefore, the primary object of this invention to provide an apparatus for corrugating plastic coverings for the continuous manufacture of plastic jacketed electrical cables. It is also the object of this invention to provide a novel method for corrugating plastic coverings for electrical cables. Other objects will be apparent to those skilled in the art upon inspection of the description presented hereinbelow.

Broadly stated, the method of this invention for providing a flexible protective covering on an electrical cable comprises advancing a continuous length of the cable through a continuous extrusion station. A continuous length of plastic is extruded therein surrounding the cable to form a covering for the cable as it passes therethrough. The inner diameter of the tubing is larger than the outer diameter of the cable to form an annular space therebetween. A positive pressure is maintained in the annular space to separate the tubing from the cable contained therein. The tube is then pulled at a predetermined rate and simultaneously is corrugated while it is still soft. The corrugated tube with the electrical cable inside is then cooled to form the desired protective covering.

Preferably, the extruded tube is allowed to expand prior to corrugation. The expansion of the extruded tube to a larger diameter has several advantages. It prevents the hot tacky plastic from collapsing on the advancing cable and permits annealing on both the interior and exterior surfaces of the freshly extruded tubes while it improves gloss and reduces strains. More particularly, increasing the diameter of the extruded tube compensates for the requirement of the extra length of tube required for the subsequent corrugation step. By expansion prior to corrugation, the reduction of the tubular wall thickness is minimized and a more superior and uniform product is thereby obtained.

Advantageously, the method of this invention may be performed by an apparatus comprising a continuously operating extruder and a crosshead having therein a central cylindrical bore for receiving a continuous length of the cable at one end of the bore and allowing it to pass through a guide tip at the opposite end of the bore and a tubing die surrounding the bore and connected to the extruder for receiving the plastic therefrom to form an extruded tubing around the emerging conductor from the guide tip. There are means for maintaining a positive pressure in the bore to separate the conductor and the extruded tubing, and there are means spaced away and aligned with the central bore for pulling and simultaneously corrugating the tubing at a rate corresponding to the rate of the emerging conductor. The corrugated tube thus formed is then cooled by conventional means to form the protective covering.

The simultaneous corrugating and pulling operations are effected preferably by a rotary embossing die having a helical ridge with a predetermined pitch. When the extruded tubing surrounding the cable passes therethrough, the helical ridge of the die corrugates the tubing while it effects a positive pulling of the tube. We found it to be eminently suitable to use a low friction type embossing die, such as a recirculating ball bearing type, in which balls are confined in a helical race with a return path. The pitch of the helical race is predetermined depending on the rate of extrusion and the travelling speed of the cable. The pulling of the plastic covering is also effected by the travelling cable to which the corrugated covering is attached on its outer periphery.

Further to illustrate this invention a specific embodiment is described hereinbelow with reference to the single accompanying drawing which shows a fragmentary detailed sectional view of the apparatus of the present invention. The apparatus 10 comprises a conventional continuous extruder (not shown) which feeds the high density polymer to a crosshead die 11. The crosshead 11 may be set at either 90°, 45°, or 30° from the extruder. Preferably, a 30° angle is used which provides a more streamline interior and is especially suitable for extruding high density polymers.

The crosshead die 11 comprises a supporting base 12 which is mounted to the extruder. The base 12 has a cylindrical bore in which there is a pipe 13 concentrically positioned therein. The internal surface 14 of the base 12 and the outer surface of the pipe 15 form an annular passage for receiving the plastic 16 from the extruder. Screwed on the end of the pipe 13 is a guide tip 17 which together with the pipe 13 forms a central bore 18 allowing the cable 19 to enter from one end of the crosshead 11 and to exit from the guide tip 17. A tubing die 20 surrounds the guide tip 17 which has an inclined surface 21 and a substantially level surface 22 surrounding the outer inclined surface 23 and the level surface 24, respectively, to form a gradual restricted annular space 25 connected to the annular space 15 and a uniform annular space 26 for the extrusion of a cylindrical pipe 27 surrounding the advancing cable 19. The tubing die 20 is mounted to the base 12 by supporting element 28.

The cylindrical bore 18, which has a larger diameter than the cable 19, is connected to a positive pressure supply source, such as compressed air or nitrogen. The gas passes through the clearance and causes the extruded tubing to expand in a cylindrical chamber 29. The chamber 29 is the interior of a cylindrical structure 30, one end of which is mounted on the supporting structure 28 by bolts 31. The opposite end of the cylindrical structure 30 has an outer cylindrical surface in the form of bearing surface 32 for supporting a rotating embossing die 33.

The embossing die 33 comprises a rotating gear 34 rotatably mounted on the cylindrical structure 30 and engaging the bearing surface 32. The gear 34 is rotated by a pinion gear 35 driven by a shaft 36 which is connected to a motor (not shown). Mounted on the gear 34 by screws 37 are recirculating ball bearings 38. The balls 39 are confined in a helical race, and there is a return path (not shown) for the recirculation of the balls. The recirculating ball bearings 38 serve as a low friction embossing die for corrugating the extruded tubing 27. The corrugation by the balls 29 causes the extruded tubing 27 to engage at a helical line of the outer periphery of the advancing cable to provide an effective pull of the tubing 27 while it is embossed. The helical race has a predetermined pitch (as shown by the dotted line) so the rotation of the ball bearings 38 also effectively pulls the tubing while embossing it.

Both the cylindrical structure 30 which forms the cylindrical chamber 29 and the rotating ball bearings die 38 are preferably equipped with heat transfer means (not shown). The heat transfer means for the cylindrical chamber 29 may be in the form of helical coils surrounding the cylindrical structure 30. Heat transfer medium is then circulated therein for cooling or heating the chamber 29 as the process may require. The die 38 may be similarly equipped with heat transfer devices for the removal or addition of heat as required by the method of this invention. For heating alone, an electrical resistant heater may be conveniently incorporated in the die to control effectively the temperature required for the corrugation operation.

The cooling of corrugated covering is carried out in a conventional manner, such as by a cooling trough (not shown). The length of the trough and its cross section depend on the size of the extruded covering and the plastic used. For high density polyethylene and polypropylene, slow cooling is preferred to prevent excess shrinking. Generally, a trough length of 30 feet to 100 feet long is adequate.

The diameter and the length of the cylindrical chamber 29 may be varied depending on several operational variables. Predominately, it depends on the extrusion rate and the depth of the corrugation. As mentioned previously, the expansion chamber 29 allows the extruded tubing to expand prior to corrugation. The expanded tubing serves effectively to provide the extra length of tubing required because of corrugation and, at the same time, it prevents the back-up of the tubing at the tip of the extrusion die. The length of the chamber 29 should be sufficient to allow the surface to change to a non-tacky stage to prevent gum-up of the embossing die. Generally, a length from 6 inches to 18 inches is adequate. The chamber, however, can be lengthened to permit annealing of the surface. It should not be so long as to cause uneven cooling of the surface.

The resultant product 40 is an insulated conductor covered by a flexible plastic covering with a helical corrugation. Due to slight shrinkage during the cooling of the covering, the covering 27 is free from the cable 19 which allows the resultant electrical cable to have maximum bending property. It is understood that the thickness of the covering depends on the specific requirements. In general, a sufficient thickness must be used to provide the required physical strength and abrasive resistance.

We claim:
1. An apparatus for providing a flexible protective covering in an electrical cable which comprises:
  (a) a continuously operating extruder;
  (b) a cross head having therein (i) a central cylindrical bore for receiving a continuous length of said cable at one end of said bore and allowing it to pass through a guide tip at the opposite end of said bore, and (ii) a tubing die surrounding said bore and connected to the extruder for receiving the plastic therefrom to form an extruded tubing around the emerging conductor from the guide tip;
  (c) means for maintaining a positive pressure in said bore to separate the conductor and the extruded tubing;
  (d) a rotating die with helical embossing tread spaced away and aligned with said central bore for pulling and corrugating said tubing simultaneously at a rate corresponding to the rate of the emerging conductor; and
  (e) means for cooling the corrugated tubing to form the protective covering.

2. An apparatus according to claim 1 wherein said helical embossing tread is a set of ball bearings in a helical track.

References Cited

UNITED STATES PATENTS

| | | | |
|---|---|---|---|
| 2,760,228 | 8/1956 | Verges | 18—14 XR |
| 3,243,850 | 4/1966 | Zieg | 18—14 XR |
| 3,280,430 | 10/1966 | Antrobus | 18—14 |
| 3,286,305 | 11/1966 | Seckel | 18—14 |

WILLIAM J. STEPHENSON, *Primary Examiner.*